US006269992B1

(12) United States Patent
Miller

(10) Patent No.: US 6,269,992 B1
(45) **Date of Patent: *Aug. 7, 2001**

(54) ARTICLE HOLDING APPARATUS FOR WHEELED VEHICLE

(76) Inventor: Jason Samuel Miller, 8317 Snug Hill La., Potomac, MD (US) 20854

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,065

(22) Filed: Jun. 8, 1998

Related U.S. Application Data

(60) Provisional application No. 60/076,142, filed on Feb. 27, 1998.

(51) Int. Cl.[7] ........................ B60R 9/00

(52) U.S. Cl. ........................ 224/407; 224/422; 224/431; 224/547; 280/288.4; 280/304.1

(58) Field of Search ........................ 224/400, 407, 224/412, 419, 422, 428–431, 433, 435, 436–439, 441, 447, 450, 547; 280/304.1, 288.4

(56) References Cited

U.S. PATENT DOCUMENTS

| | | | | |
|---|---|---|---|---|
| 1,963,333 | * | 6/1934 | Morales | 224/422 |
| 3,159,368 | * | 12/1964 | Ahlbin et al. | 224/547 X |
| 3,167,284 | * | 1/1965 | Lynch | 224/422 X |
| 3,396,885 | * | 8/1968 | Giondi | 224/429 X |
| 3,414,223 | * | 12/1968 | Pawsat | 224/422 X |
| 3,466,966 | * | 9/1969 | Brown | 411/913 X |
| 3,592,487 | * | 7/1971 | Mansperger | 224/422 X |
| 4,580,803 | | 4/1986 | Davis . | |
| 4,705,287 | | 11/1987 | Cumbie . | |
| 4,753,449 | | 6/1988 | Doucet . | |
| 4,795,182 | | 1/1989 | Dyess et al. . | |
| 4,919,443 | | 4/1990 | Kehler . | |

(List continued on next page.)

FOREIGN PATENT DOCUMENTS

| | | | | |
|---|---|---|---|---|
| 63797 | * | 8/1945 | (DK) | 224/32 A |
| 869195 | * | 1/1942 | (FR) | 224/32 A |
| 874766 | * | 4/1942 | (FR) | 224/32 A |
| 2368395 | * | 6/1978 | (FR) | 224/32 A |

OTHER PUBLICATIONS

NCM Consumer Products Division, 1997 *After Therapy Catalog,* p. 20 (copyright 1996).
Sammons Preston 1996 Catalog, pp. 157–160, 162–165 (copyright 1996).
Sammons Preston Winter 1996/97 *Enrichments,* pp. 36, 38–41 (copyright 1996).
Quickie Designs, Inc., *Options & Accessories Catalogue,* pp. 11–12 (copyright 1996).
Smith & Nephew Rehabilitation, 1996 *Consumer–Direct Catalog,* pp. 19–21 (copyright 1996).
Tote Bags And Accessories Sammons Preston 1996 Catalog, pp. 158–160.
Bags and Baskets Disabled Living Foundation Web Site, retrieved between May to Jun. 1997, unnumbered pages.

*Primary Examiner*—Gregory Vidovich
(74) *Attorney, Agent, or Firm*—Young & Basile, P.C.

(57) ABSTRACT

An article holding apparatus is disclosed for use in conjunction with a wheeled vehicle of the type including an axle upon which the vehicle wheel is rotatably mounted. The apparatus comprises an article holder, and a mount connectable to the vehicle. According to one embodiment, the article holder is connectable to the mount so as to be rotatable independently of the rotation of the vehicle wheel. According to another embodiment, the mount defines the exclusive point of securement to the vehicle for the article holder, and the mount and the article holder each comprise slidably interconnectable mounting elements. Per this embodiment, the article holder may be rotatable independently of the rotation of the vehicle wheel.

12 Claims, 6 Drawing Sheets

U.S. PATENT DOCUMENTS 5,040,813 8/1991 Cumbie .
5,246,240 9/1993 Romich et al. .
5,303,945 4/1994 Oxford .
5,320,263 * 6/1994 Ahlbin et al. .................... 224/547 X
5,588,661 * 12/1996 Wolfe ............................... 224/422 X
5,647,643 * 7/1997 Noble ................................ 301/110.5
5,667,117 * 9/1997 Nutto ............................... 224/430 X

* cited by examiner

FIG-1
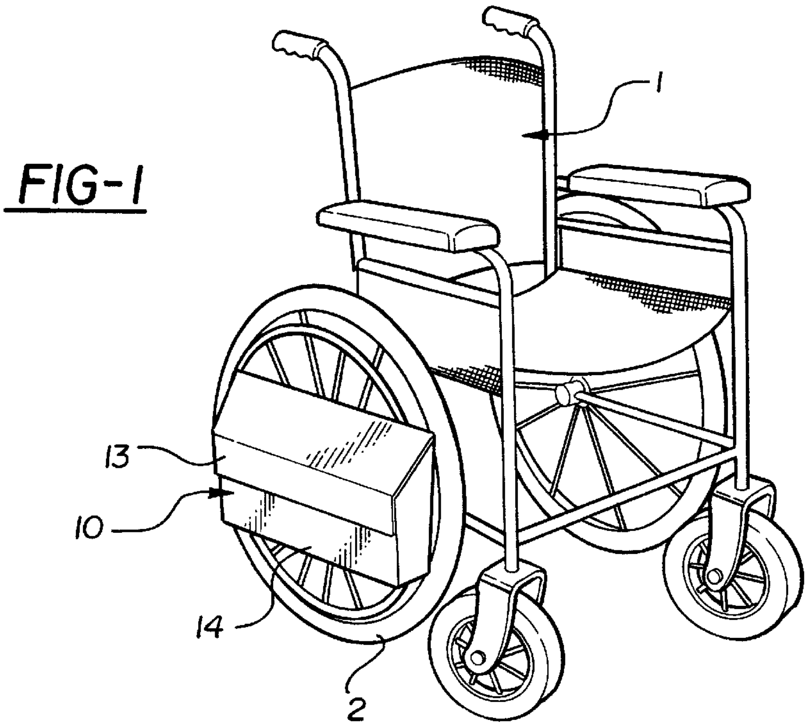
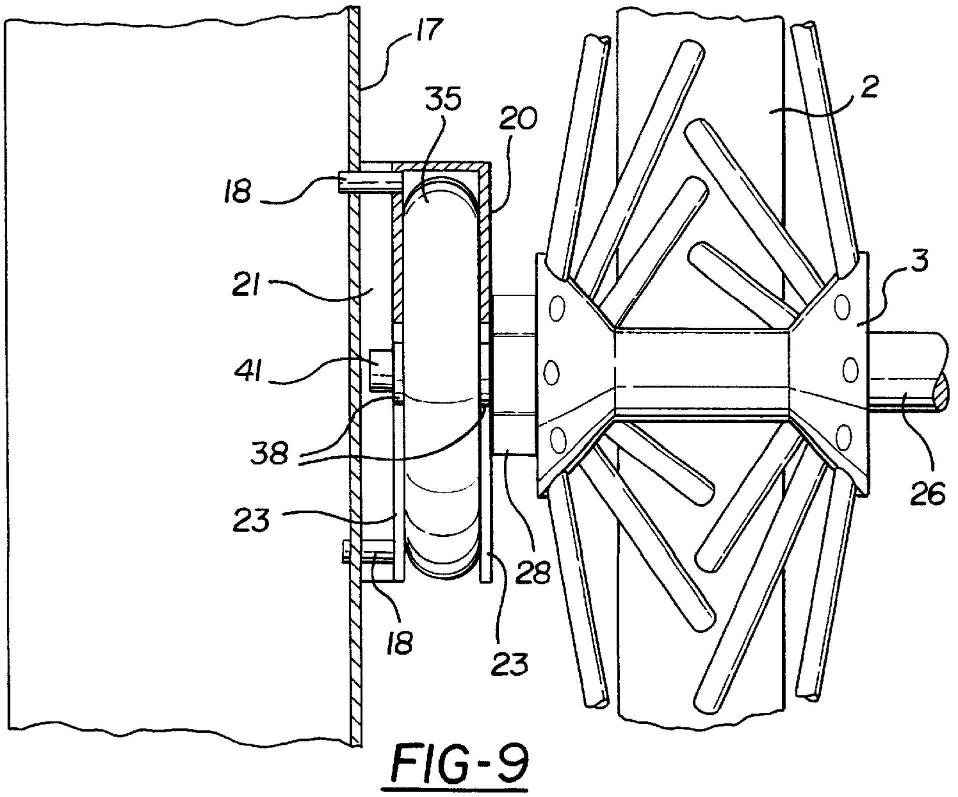
FIG-9

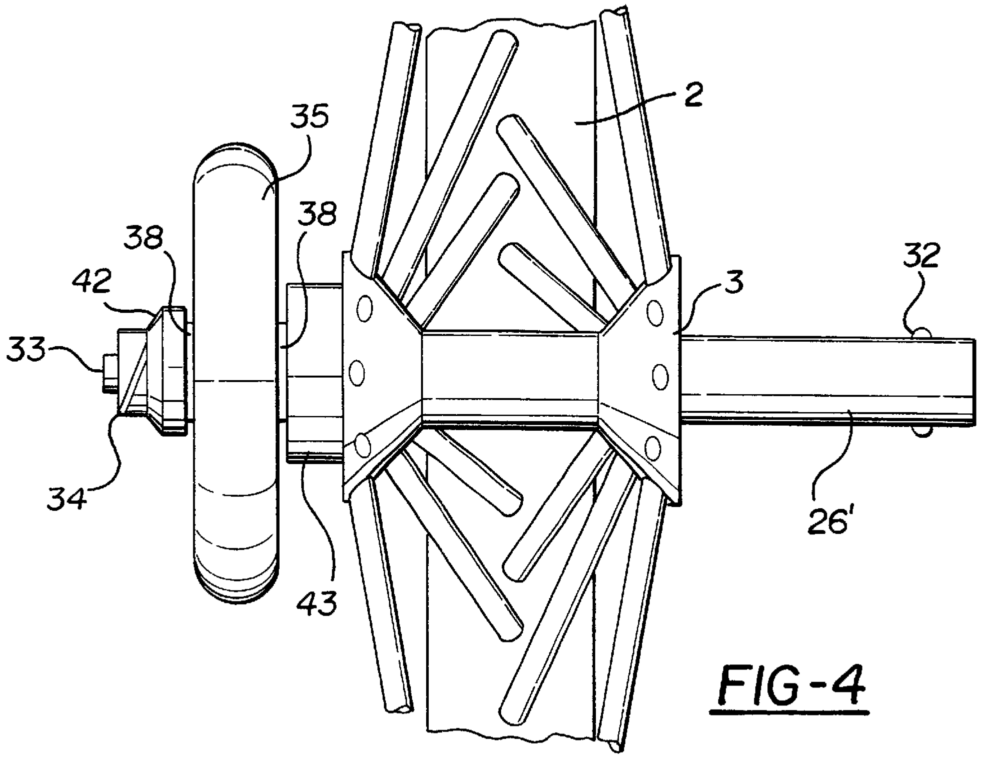
FIG-4
FIG-5
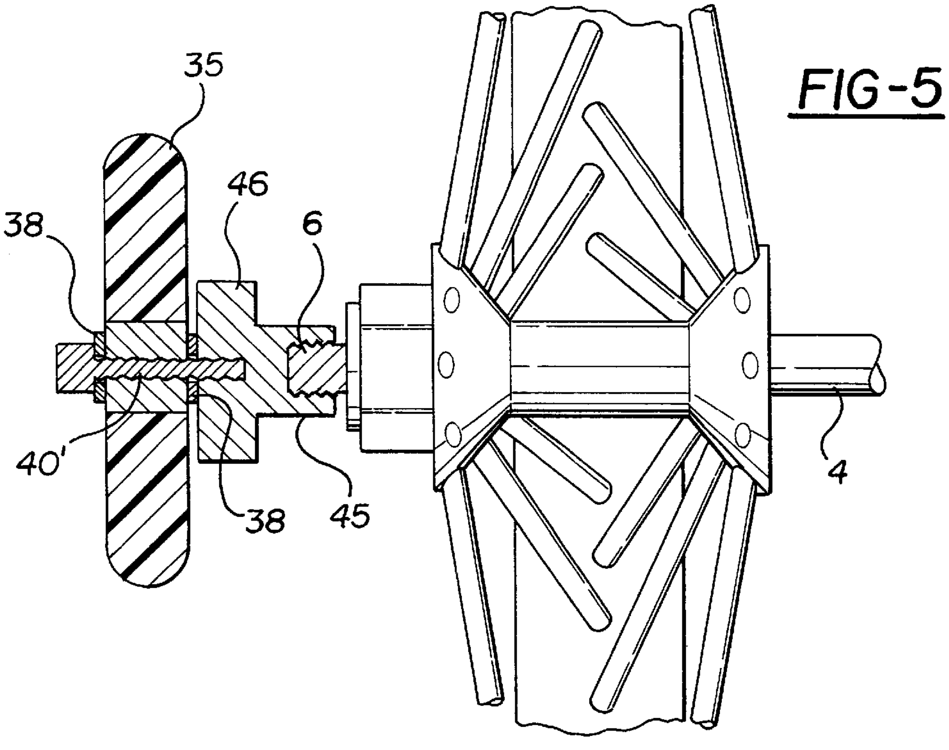

FIG-7D
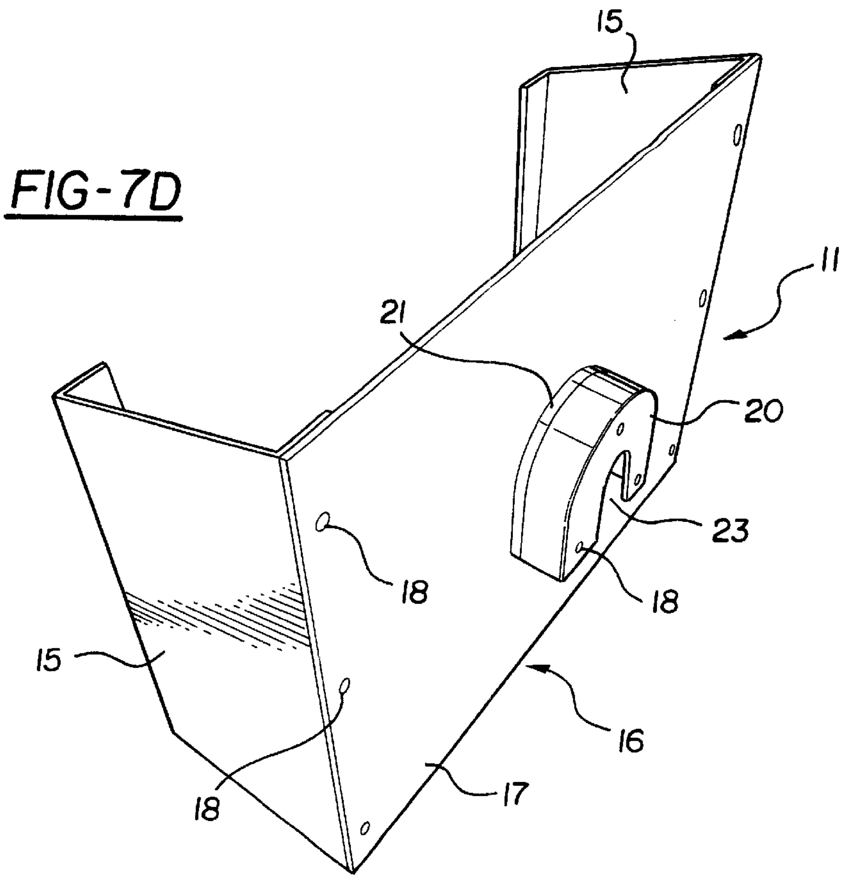
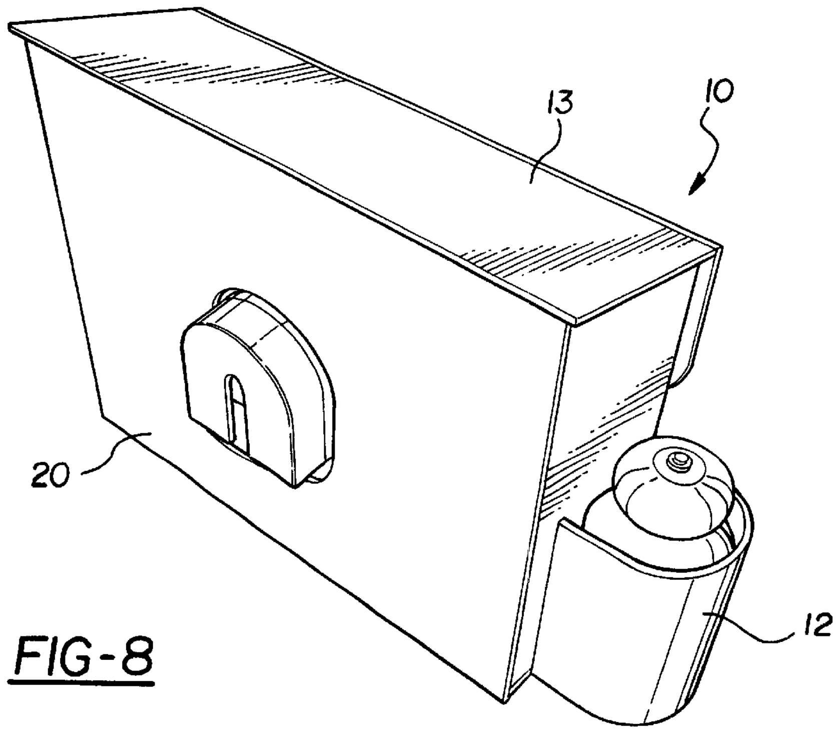
FIG-8

ARTICLE HOLDING APPARATUS FOR WHEELED VEHICLE

CROSS-REFERENCE TO RELATED APPLICATION

This application claims the benefit of priority from prior U.S. Provisional Patent Application Serial No. 60/076,142, filed Feb. 27, 1998.

FIELD OF THE INVENTION

The present invention relates to an article holding apparatus for a wheeled vehicle, and more particularly to such an apparatus comprising an article holder and mount connectable to a wheel of the vehicle in coaxial arrangement with the rotational center of the vehicle wheel. The article holder is connectable to the mount so as to be disposed outboard of the vehicle wheel.

BACKGROUND OF THE INVENTION

Article holders for wheeled vehicles are generally known as a means for transporting articles, and are exemplified by article holders for bicycles, wheelchairs, and the like. However, typical prior art article suffer from a number of drawbacks.

Respecting wheelchairs in particular, there presently exist no article holders intended to be physically attached to a wheelchair and which are easily accessible by persons confined to wheelchairs. Because of the restricted reach and mobility of persons confined to wheelchairs, the placement of the article holder is important. Currently, the traditional fabric-style bag is the article holder most commonly employed by the majority of wheelchair users. This type of bag is typically hung from the side arm rests of the wheelchair or from the support structure on the back of the wheelchair frame. The placement of these prior art type bags is disadvantageous in that it interferes with the movement of the wheelchair's wheels, thus affecting the overall maneuverability of the wheelchair. With the traditional fabric-style bag the presumably easy task of removing and/or placing articles in the bag, especially when the bag is hung on the back of the wheelchair frame, becomes extremely difficult if not altogether impossible. Additionally, it is very difficult for wheelchair users to maintain sight of these bags when they are placed on the back of the wheelchair. This can require the wheelchair user to resort to the assistance of a second party in order to make use of the bag.

At least one answer to these problems has been the swing-out style back pack, disclosed by Kehler, U.S. Pat. No. 4,919,443, according to which a back pack is pivotally disposed on a post secured in vertical orientation to the wheelchair frame. With this device, however, there still remain problems of inaccessibility when the pack is returned to its resting position in back of the user. The swing-out style back pack is also disadvantageous in that, in the accessible orientation, the back pack covers the armrest area of the side of the wheelchair upon which the back pack swings out, thereby preventing the wheelchair user from maintaining contact with the wheel on that side of the chair. This causes a loss of wheelchair maneuverability and, ultimately, lack of safety for the wheelchair user.

Still other article holders peculiar to wheelchairs include the under-the-chair net extending under the seat portion of the wheelchair. Unfortunately, articles placed in the under-the-chair net tend to bounce out of the net, especially while the wheelchair is traversing bumpy terrain. This results in the loss of articles from the net.

Other references of interest with respect to the prior art type article holders include Davis, U.S. Pat. No. 4,580,803, illustrating an armrest-mounted wheelchair accessory that may accept a wire basket, desk top or tray attachment; Dyess, et al., U.S. Pat. No. 4,795,182, teaching a wheelchair with a pivoted basket mounted to a vertical frame portion of the wheelchair; Cumbie, U.S. Pat. Nos. 5,040,813 and 4,705,287, teaching, respectively, an accessory holder and mount for a wheelchair of the type having no arm rests, the mount including a base secured to a lower frame member of the wheelchair, and a tray support for a wheelchair, the tray support being carried by an arm pivotally disposed on one of the vertical supports of the wheelchair; and Romich, et al., U.S. Pat. No. 5,246,240, teaching an apparatus for mounting equipment to wheelchairs, the apparatus being mounted to the armrest of a wheelchair.

SUMMARY OF THE INVENTION

It is an object of the present invention to provide a convenient, attractive, and multipurpose article holding apparatus for wheeled vehicles that is more accessible, more versatile, and much easier to use, particularly in applications for persons with physical handicaps, such as those confined to wheelchairs.

These and other objects of the present invention are accomplished via an article holding apparatus for a wheeled vehicle of the type having at least one wheel, the apparatus comprising an article holder, and a mount connectable to a wheel of the vehicle in coaxial arrangement with the rotational center of the wheel. The article holder is connectable to the mount so as to be disposed outboard of the vehicle wheel.

According to one embodiment of this invention, the mount comprises an axle which is also the axle for the wheel of the vehicle. The axle may take the form of a quick release axle of known construction, such that the axle is easily removed from the vehicle for disassembly.

According to another embodiment, the mount is coaxially connectable with the existing axle of a vehicle wheel. The mount may take the form of an internally threaded bolt adapted to be coaxially threadingly engageable with the threaded outboard end of the existing vehicle axle. In a further embodiment, the existing vehicle axle may be of the type including a longitudinal bore therein. According to this embodiment the mount comprises a compressible sleeve receivable within the longitudinal bore, the compressible sleeve being radially expandable within the longitudinal bore to connect the axle to the mount.

According to one feature of the present invention, the mount and the article holder may be provided with interconnecting mounting elements to removably connect the article holder to the mount. The interconnecting mounting elements may, according to further feature, comprise a bracket provided on either of the article holder or the mount, and a mount wheel rotatably disposed on the other of the article holder or the mount. The mount wheel is removably receivable within the bracket to connect the article holder to the mount.

BRIEF DESCRIPTION OF THE DRAWINGS

These and other objects and advantages of the present invention will become apparent upon the reading of the following detailed description and by referencing the following drawings in which:

FIG. 1 is a quartering perspective view of the carrying pack apparatus of the present invention shown in one application mounted to and outboard of the wheel of a wheelchair;

FIG. 4 illustrates a second embodiment of the mount of the present invention, also shown in conjunction with the wheel and hub of a wheeled vehicle;

FIG. 5 is a partial lateral cross-section of a third embodiment of the mount of the present invention shown connected to the existing axle of a wheeled vehicle;

FIG. 7D is a perspective view of the article holder body of FIGS. 7A–7C;

FIG. 8 is a perspective view of the article holder of the present invention; and FIG. 9 is a partial lateral cross-sectional view of the article holding apparatus of the present invention, illustrating the mount of FIG. 2 removably connected to the Body of FIGS. 7A–7D.

DESCRIPTION OF THE ILLUSTRATED EMBODIMENT

Turning now to the drawings, and particularly to FIG. 1, the article holding apparatus of the present invention is illustrated in one operational configuration, according to which the article holder 10 is mounted outboard of the rotational center of the wheel 2 of a traditional wheelchair 1. But while the specification describes the present invention in conjunction with a traditional wheelchair, it will be appreciated with reference to the specification that the present invention has operational utility in conjunction with a number of wheeled vehicles, including bicycles and other wheelchair types, according to user preference.

Still referring to FIG. 1, the article holding apparatus of the present invention most generally comprises article holder 10 and a mount (not shown) provided coaxial with the rotational center of the vehicle wheel 2, the article holder being connected to the mount. The article holder 10 and mount are each most preferably provided with interconnecting mounting elements, hereinafter described, permitting the article holder and mount to be removably connected.

Figure 2:
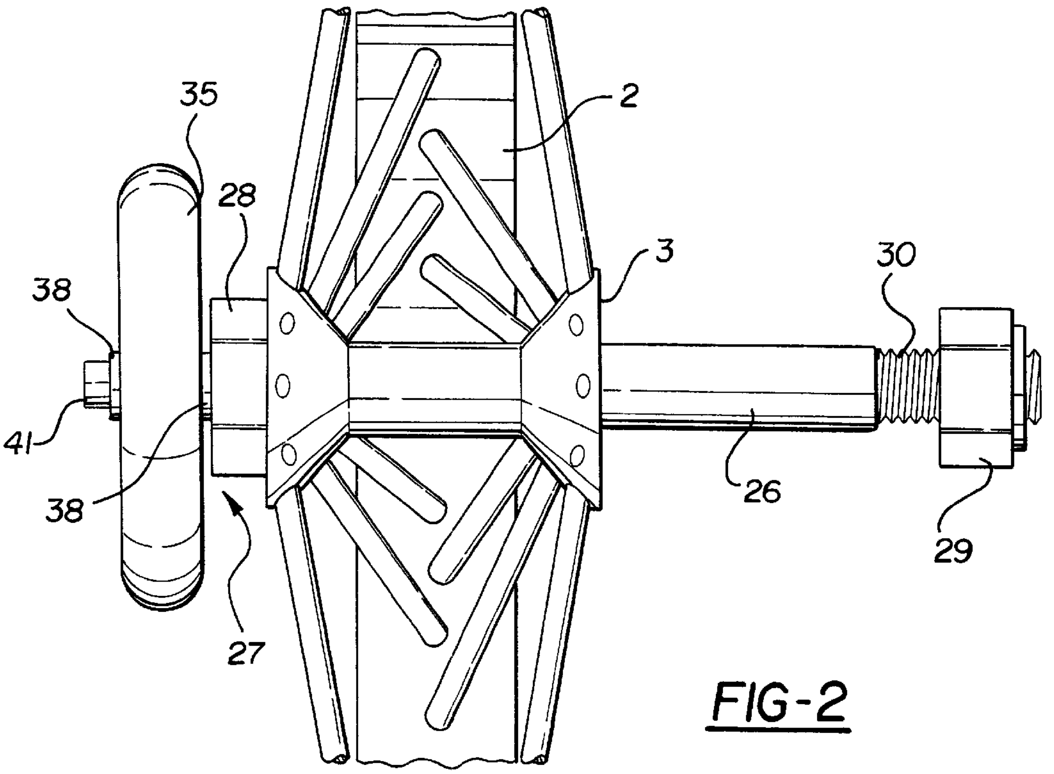
FIG. 2 is a lateral elevation of a first embodiment of the mount of the present invention shown in conjunction with the wheel and hub of a wheeled vehicle.
Figure 3:
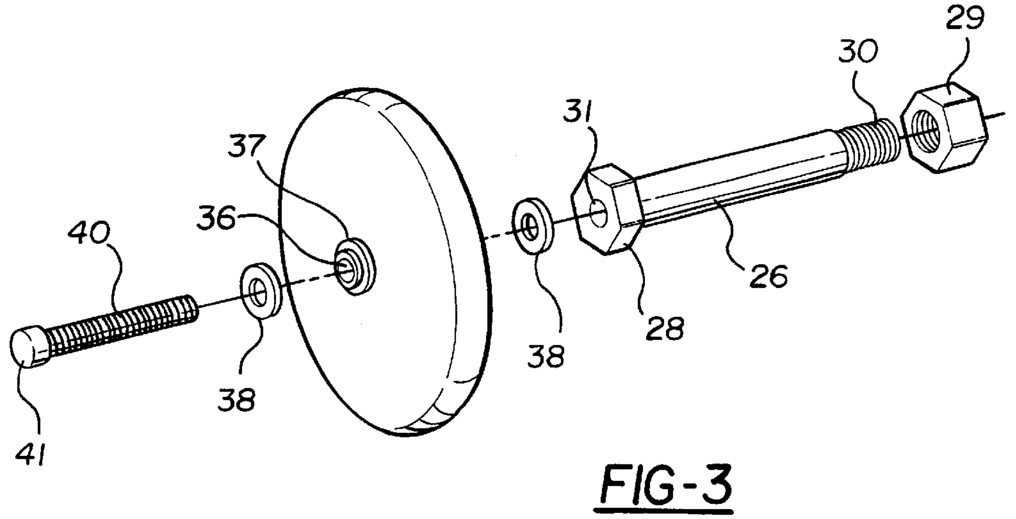
FIG. 3 is an exploded perspective view of the mount of FIG. 2.

As illustrated in FIGS. 2 and 3, the mount of one embodiment of the present invention generally comprises a metal axle 26, such as the shoulder bolt shown, outboard end 27 of the axle being provided with means for securing the carrying pack 10 thereto. As depicted, axle 26 of this embodiment also comprises the axle for wheel 2, hub 3 therefor being rotatably mounted coaxially on the axle. Bolt head 28 provided proximate outboard end 27 of axle 26 prevents removal of hub 3 from the axle. A threaded nut 29 threadingly connected to threaded end 30 of axle 26 securely connects the axle to the wheelchair frame (not shown), as is known in the art.

Still referring to FIGS. 2 and 3, the article holder and mount of the present invention are most preferably provided with interconnecting mounting elements, provided at the outboard end 27 of axle 26, to removably connect the carrying pack to axle 26 of the mount. The interconnecting mounting elements of the mount generally comprise a mount wheel 35 coaxially connected to axle 26 by threaded bolt 40 receivable through bore 36 provided through the mount wheel. Bore 31 provided in axle 26 is adapted to threadingly receive bolt 40 therein, securely connecting mount wheel 35 to axle 26. In the most preferred form, mount wheel 35 is freely rotatable on the shaft of bolt 40. To this end, mount wheel 35 includes a central hub 37, such as a roller bearing cartridge of a type known in the art, about which mount wheel 35 freely rotates. A pair of spacers 38 in the form of flat washers coaxially receivable on the shaft of bolt 40 and positioned on opposite sides of hub 37 prevent bolt heads 28 and 41 from frictionally engaging the lateral surfaces of mount wheel 35 and limiting the free rotation thereof.

Of course, it will be appreciated with reference to the remainder of the specification that the mount wheel described in the foregoing embodiment, as well as the alternative embodiments disclosed hereinbelow, need not be rotatable in order for the article holder to be connected thereto.

According to a second embodiment of the mount of the present invention, shown in FIG. 4, axle 26' comprises a quick release axle of the type known in the art for easy removal of a wheelchair wheel from the wheelchair frame. Specifically, axle 26' of this embodiment includes a pair of radially opposed ball bearings 32 provided at one end of the axle and retractable into the body thereof upon depression of thumb switch 33, as is known in the art, in order to connect or disconnect axle 26' from the wheelchair frame (not shown). The mounting elements of this embodiment are essentially as shown and described for the embodiment of FIGS. 2 and 3, mount wheel 35 being coaxially disposed on axle 26' and securely connected thereto by nut 42 threadingly connected to a threaded end 34 of axle 26'. A spacer 43 provided between hub 3 and adjacent spacer 38 in this alternate embodiment of the present invention maintains the position of the wheel hub 3 on axle 26' when the same is connected to the wheelchair frame.

FIG. 5 illustrates yet another embodiment of the present inventive mount, according to which the mount comprises an internally threaded bolt 45 adapted to be coaxially threadingly engageable with the threaded outboard end 6 of the existing axle 4 of a conventional wheeled vehicle, such as the wheelchair shown. Bolt 45 includes hexagonal bolt head 46 to facilitate engagement or disengagement of bolt 45 relative to threaded end 6 by means of a wrench or the like. The interconnecting mounting elements of this embodiment are substantially as shown and described in relation to the embodiment of FIGS. 2 and 3, bolt 40' of the embodiment of FIG. 5 being threadingly receivable in a blind bore provided in bolt 45. According to this embodiment, it will be appreciated that axle 4 is of a type common to many wheeled vehicles, and does not comprise an element of the present inventive mount.

Figure 6A:
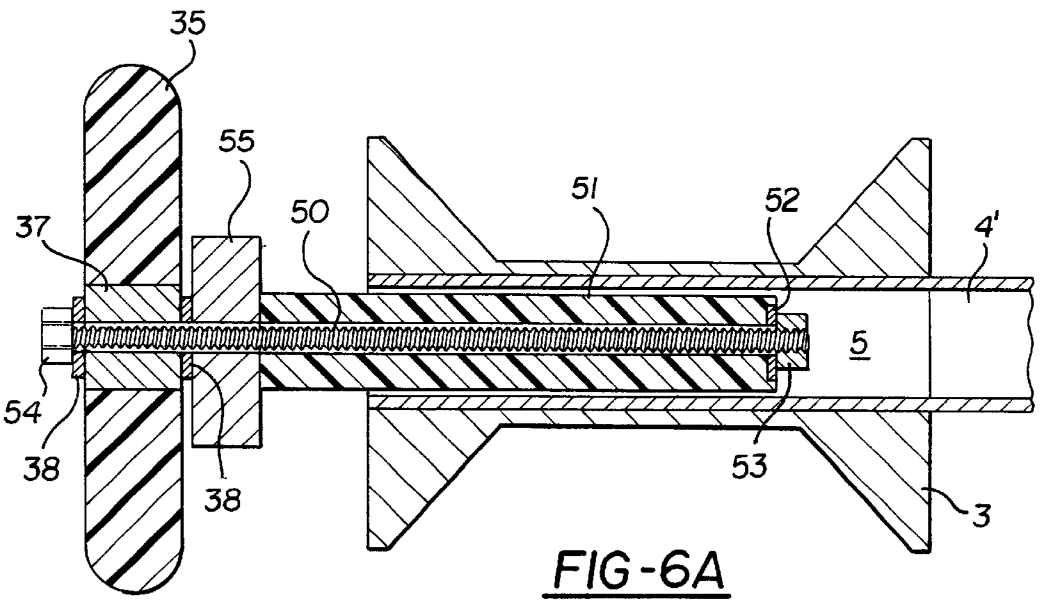
FIG. 6A depicts in cross-section a fourth embodiment of the mount of the present invention, shown in conjunction with the existing axle and hub of a wheeled vehicle.
Figure 6B:
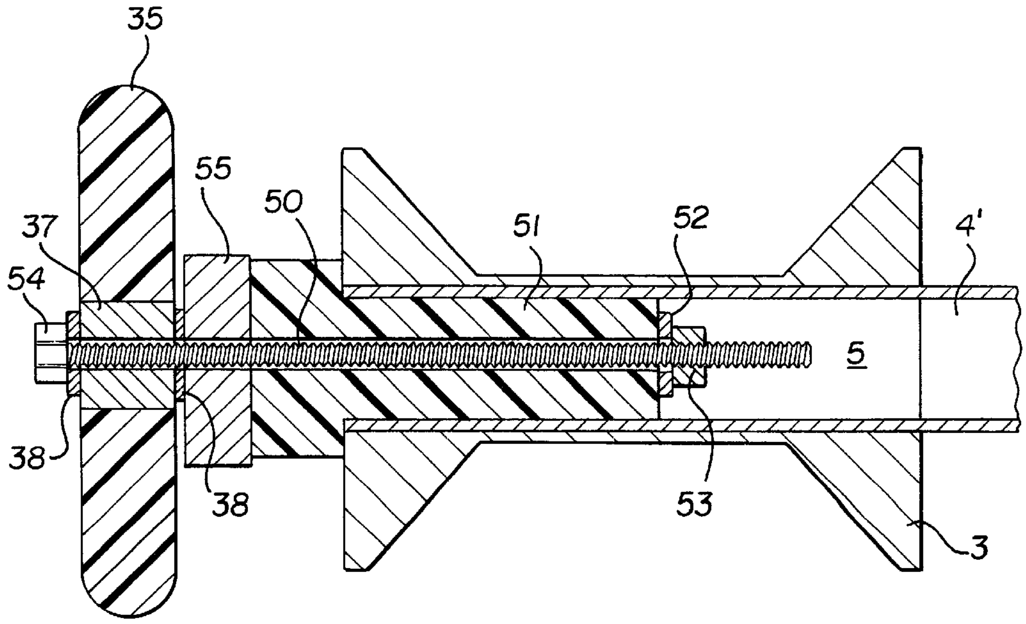
FIG. 6B illustrates the mount of FIG. 6A securely connected to the axle of the wheeled vehicle.
Figure 7A:
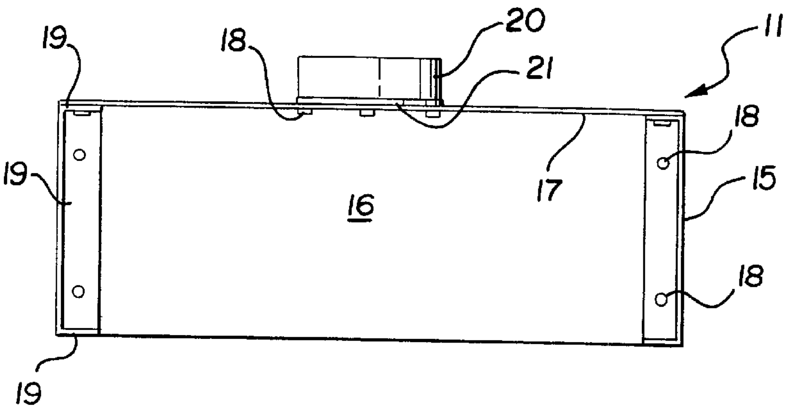
FIG. 7A depicts a top view of the body of the article holder of the present invention.
Figure 7B:
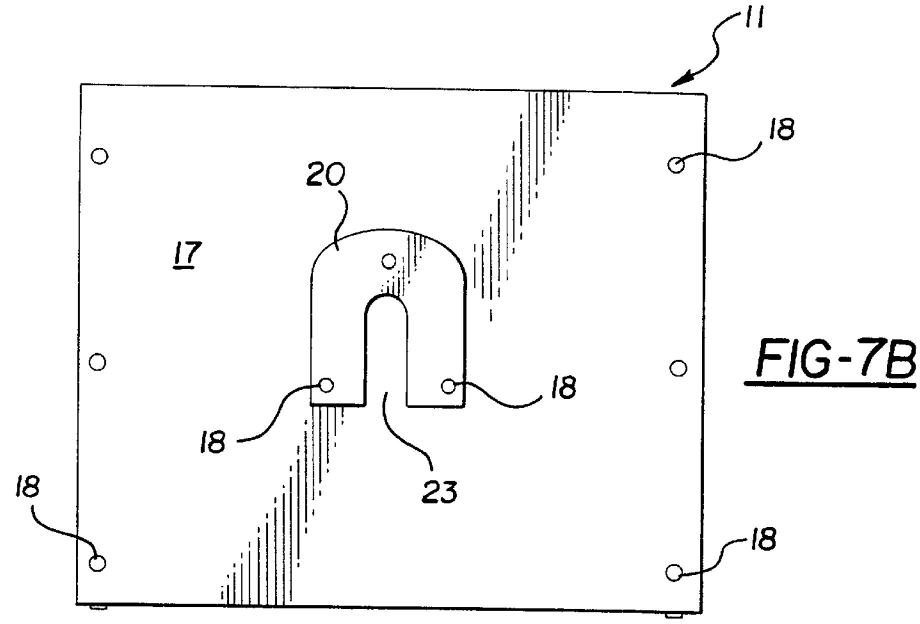
FIG. 7B is a rear elevation of the article holder body of FIG. 7A.
Figure 7C:
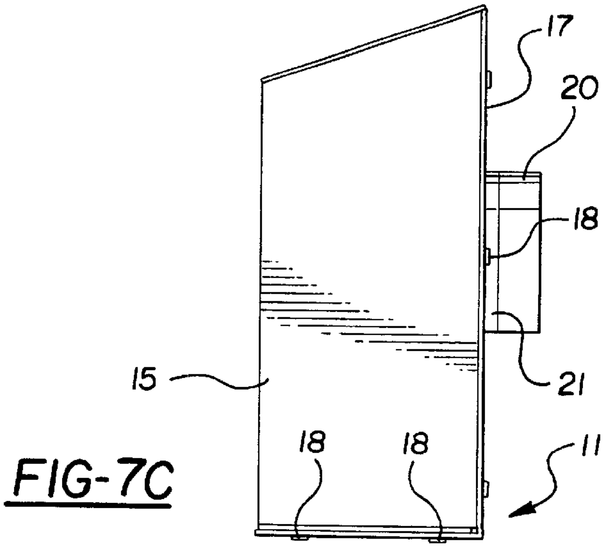
FIG. 7C is a lateral elevation of the article holder body of FIG. 7A.

FIGS. 6A and 6B depict a fourth alternative embodiment of the present inventive mount, according to which the mount is connectably receivable within longitudinal bore 5 provided in the existing axle 4' of a wheeled vehicle. The mount most generally comprises a threaded shaft 50, such as the illustrated shoulder bolt, and an axially compressible sleeve 51 made of rubber or the like provided coaxially over the principal length of shaft 50, as shown. Washer 52 and nut 53 are receivable onto an end of shaft 50 to securely retain compressible sleeve 51 thereon. Spacer 55 is provided between an end of sleeve 51 and spacer 38 adjacent mount wheel 35. As shown in FIG. 6B, rotation of shaft 50 in a first direction results in compression of sleeve 51 as washer 52 and nut 53 move upwards along the length of shaft 50. The resultant radial expansion of sleeve 51 results in the compression sleeve securely frictionally engaging the interior circumferential surface of longitudinal bore 5. According to the mount of this embodiment, mount wheel 35 is preferably rotatably disposed on shaft 50 as shown, spacers 38 on opposite lateral sides of hub 37 being sandwiched between bolt head 54 and spacer 55.

Referring now to FIGS. 1 and 7A through 8, article holder 10 of the present invention preferably comprises a rigid, four-sided body 11 substantially surrounded by a covering of non self-supporting material (not shown in FIGS. 7A through 7C), such as fabric, to define an interior space for containing articles. A cover flap 13, also comprising a non self-supporting material, permits the article holder 10 to be sealed as desired. Closure means (not shown), such as hook-and-loop type fasteners, zippers, buckles, or the like may be provided between cover flap 13 and at least the front wall 14 of the covering to permit article holder 10 to be securely closed. The article holder 10 may include such further features as a water bottle holder 12 and exterior webbed pockets (not shown), as desired, though it will be understood that such features do not comprise elements of the present invention.

As depicted in FIGS. 7A through 7D, body 11 comprises side walls 15, bottom wall 16, and rear wall 17. Body 11 is preferably manufactured of a suitably durable and rigid material, such as metal or ABS plastic. Bottom 16 and rear 17 walls are preferably of one-piece construction, being formed in right-angular relation to each other and fastened to side walls 15 by suitable fastening means, such as the illustrated rivets 18. Flanges 19 formed in side walls 15 abut bottom 16 and rear 17 walls, providing contact surfaces for fastening the side, bottom and rear walls together.

Rear wall 17 of body 11 is most preferably provided with interconnecting mounting means comprising a generally "U"-shaped bracket 20 opening toward bottom wall 16. Bracket 20 and a complementary-shaped spacer 21 are connected to rear wall 17 by suitable fastening means, such as the illustrated rivets 18. As shown in FIG. 8, bracket 20 extends through an opening provided in the covering fabric such that the covering does not interfere with removable interconnection between the mounting elements or the present invention.

Referring now to FIG. 9, interconnection of the article holder and mount of the present invention will be better understood, particularly in relation to the mount of the embodiment of FIGS. 2 and 3 and the interconnecting mounting elements described hereinabove. As shown, bracket 20 is dimensioned to receive mount wheel 35 therein. To this end, slots 23 provided centrally in bracket 20 on opposing surfaces thereof are adapted to receive portions of the interconnecting mounting elements, as hereinafter described, to facilitate connection of the article holder and mount of the present invention. Mount wheel 35 is received interiorly of bracket 20, spacers 38 being received in slots 23 on opposite sides of the bracket. It will be appreciated that the thickness of spacers 38 is preferably at least the same as the thickness of the front and rear walls of bracket 20, such that bolt head 28 abuts the exterior surface of bracket 20, as shown, so as to provide increased stability to the connection between the mount and article holder.

Once mounted in the correct position, it will be appreciated that the article holder is easily reachable and visible from the normal sitting position in a wheelchair, even for persons with limited mobility. When traversing narrow doorways or when otherwise desired, it will also be appreciated that the interconnecting mounting elements permit the entire article holder to be easily lifted off the mounting wheel 35 and placed in the lap of the wheelchair user. The article holder can then be easily replaced on the mount as heretofore described.

With mount wheel 35 rotatably mounted, as per one feature of the present invention, it will be understood that a pivot point is provided for rotation of the article holder relative to the mount such that the article holder can be maintained in a substantially horizontal position irrespective of the attitude of the wheeled vehicle. This is particularly advantageous when the present invention is used in conjunction with a wheelchair, since the article holder will remain easily accessible to the user even when the wheelchair is traversing an inclined plane.

Of course, it will be appreciated that the article holder of the present invention may be fixed directly to any of the mounts described hereinabove in their various embodiments, according to a number of means, without employing the interconnecting mounting elements disclosed herein. Thus, for example, it is certainly within the scope of this invention that the apparatus thereof may be modified such that the article holder is directly fastened to the vehicle wheel axle. For instance, the article holder may be captured between the threaded end of a conventional axle 4 and the internally threaded bolt 45, as those elements shown and described in relation to the mount of the embodiment FIG. 5.

And while the interconnecting mounting elements of the present invention are depicted with the bracket provided on the article holder and the mount wheel disposed on the mount in its various embodiments, those of skill will appreciate that the arrangement of these elements may be easily reversed with only minor modification to the embodiments described herein.

Thus it is evident that there has been provided in accordance with the present invention an article holding apparatus that fully satisfies the objects, aims and advantages previously set forth. While the invention has been described in conjunction with the specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the invention, as set forth in the appended claims.

The invention in which an exclusive property or privilege is claimed is defined as follows:

1. An article holding apparatus adapted to be secured to the axle of a wheeled vehicle, said article holding apparatus comprising:

a mount adapted to be connectable exclusively to the vehicle axle;

a container connectable exclusively with said mount, said container having one or more side walls and a bottom, said one or more side walls and bottom defining an interior volume for holding articles in said container; and said mount and said container comprising interconnecting mounting elements, whereby said container and said mount are interconnectable in sliding engagement such that said container is freely disengageable from said mount when said mount is secured to the vehicle axle, and wherein further said interconnecting mounting elements comprise a mount wheel, and a bracket having generally confronting surfaces adapted to capture said mount wheel therebetween such that, when said container is connected to said mount, said container is securely engaged with said mount.

2. The article holder of claim 1, wherein said mount comprises said mount wheel, and said container comprises said bracket.

3. The article holding apparatus of claim 2, wherein said mount is adapted for securement to a vehicle axle of the type including a threaded portion, and said mount further comprises a threaded member adapted to threadingly secure said mount wheel to the threaded portion of the vehicle axle.

4. The article holding apparatus of claim 3, wherein said mount wheel is freely rotatable about a fixed rotational axis, and said bracket is connectable to said mount wheel so that said container is moveable with said mount wheel about said fixed axis of rotation to thereby maintain said container in a relatively horizontal attitude irrespective of the attitude of the vehicle.

5. The article holding apparatus of claim 1, wherein said mount is adapted for frictional securement to the vehicle axle.

6. The article holding apparatus of claim 5, wherein the vehicle axle is of the type including a passageway therein, and said mount further comprises a compressible member adapted to be selectively radially expandable within the passageway for frictional engagement therewith.

7. The article holding apparatus of claim 6, wherein said mount wheel is freely rotatable about a fixed rotational axis, and said bracket is connectable to said mount wheel so that said container is moveable with said mount wheel about said fixed axis of rotation to thereby maintain said container in a relatively horizontal attitude irrespective of the attitude of the vehicle.

8. An article holding apparatus adapted to be seccured to the axle of a wheeled vehicle, said article holding apparatus comprising:

a mount adapted to be connectable exclusively to the vehicle axle;

a container having one or more side walls and a bottom, said one or more side walls and bottom defining an interior volume for holding articles in said container, said container adapted to be connectable exclusively to said mount; and wherein, when said container is connected to said mount for operational use with the vehicle in motion, said container is freely movable on said mount to thereby maintain said container in a relatively horizontal attitude irrespective of the attitude of the vehicle as the vehicle is in motion.

9. The article holder of claim 8, wherein said mount comprises a mount wheel rotatable about a fixed rotational axis, and said container comprises a bracket connectable to said mount wheel so that said container is moveable with said mount wheel about said fixed axis of rotation.

10. The article holding apparatus of claim 9, wherein said mount is adapted for securement to a vehicle axle of the type including a threaded portion, and said mount further comprises a threaded member adapted to threadingly secure said mount wheel to the threaded portion of the vehicle axle.

11. The article holding apparatus of claim 10, wherein said mount is adapted for frictional securement to the vehicle axle.

12. The article holding apparatus of claim 11, wherein the vehicle axle is of the type including a passageway therein, and said mount further comprises a compressible member adapted to be selectively radially expandable within the passageway for frictional engagement therewith.

* * * * *